Dec. 4, 1962  F. R. KOBEE  3,066,872
VISCOUS FLUID APPLICATOR
Filed March 3, 1960  2 Sheets-Sheet 1

INVENTOR.
Frank R. Kobee

Dec. 4, 1962    F. R. KOBEE    3,066,872
VISCOUS FLUID APPLICATOR
Filed March 3, 1960    2 Sheets-Sheet 2
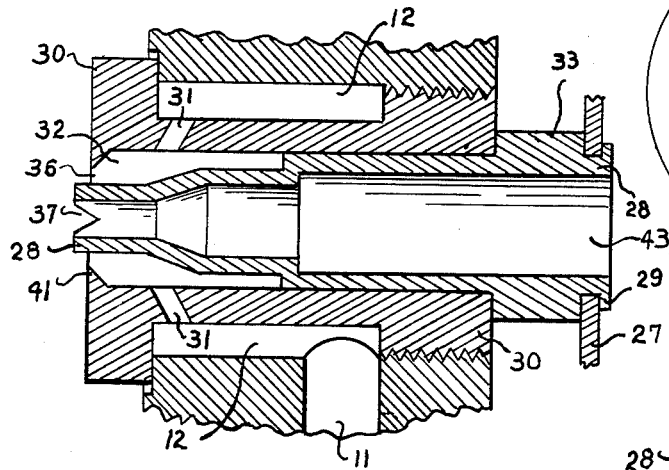
FIG. 2
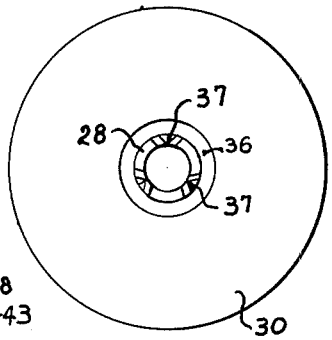
FIG. 8
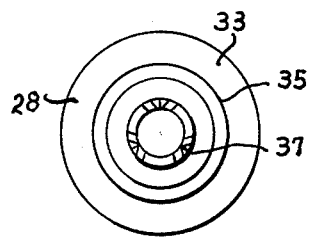
FIG. 4
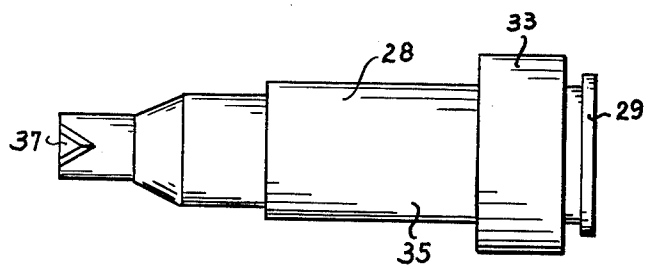
FIG. 3
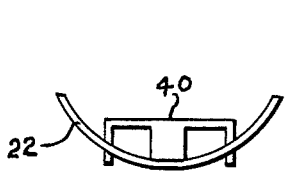
FIG. 7
FIG. 5
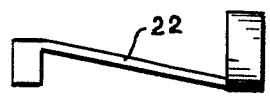
FIG. 6
INVENTOR.
Frank R. Kobee

United States Patent Office 3,066,872
Patented Dec. 4, 1962

3,066,872
VISCOUS FLUID APPLICATOR
Frank R. Kobee, 1839 Macomber St., Toledo 6, Ohio
Filed Mar. 3, 1960, Ser. No. 12,530
6 Claims. (Cl. 239—346)

This invention relates to a viscous fluid applicator and more particularly to a spray gun for applying epoxy and polyester resins and other fluids of relatively high viscosity.

At the present time epoxy and polyester resins are either brushed on or applied by means of an atomizing spray gun. When these resins are brushed on difficulty is encountered in obtaining a uniform thickness of layer and furthermore the process is slow. When the resins are brushed on over fiberous materials the resins do not properly penetrate the layer of fibers and consequently a porous product is obtained. When an atomizing spray gun is used to apply the resin many of the small particles of resin float in the air. These small particles are hazardous and must be removed by expensive ventilating devices. After using a resin sprayer the resin must be immediately removed and the sprayer cleaned thoroughly otherwise the resin hardens and renders the sprayer useless. The job of cleaning or removing the resin from the present type atomizer is very difficult, particularly, the removal of the resin from the nozzle.

In my improved viscous fluid applicator the resin is not atomized but leaves the nozzle in small droplets or globules. These small droplets are too large to float in the air, hence no ventilating equipment or air purifying equipment is needed when my viscous fluid applicator is used. My viscous fluid applicator is readily cleaned because the resin container and nozzle can be discarded after it is used. Since little or no resin contacts any other part of my viscous fluid applicator little or no cleaning is necessary.

One of the objects of this invention is to provide a viscous fluid applicator that applies the viscous fluid in droplets or globules.

Another object of my invention is to provide a viscous fluid applicator that eliminates atomization, thereby eliminating the use of air cleaning equipment.

Another object of my invention is to provide a viscous fluid applicator in which the fluid container and the nozzle can be discarded after use.

Another object of the invention is to provide a viscous fluid applicator that can readily be cleaned after use.

Another object of this invention is to provide a viscous fluid applicator that is simple, durable and inexpensive.

These and other objects and features of the invention will appear more fully from the accompanying description and drawings and will be more particularly pointed out in the claims.

In the drawings:

FIG. 2 is an enlarged sectional view of the nozzle, nozzle bushing and air passageways of my viscous fluid applicator shown in FIG. 1.

FIG. 3 is an enlarged front elevation of the nozzle member used in my viscous fluid applicator.

FIG. 4 is an end view of the nozzle shown in FIG. 3.

FIG. 5 is a top plan view of the fluid container retaining member used in my viscous fluid applicator.

FIG. 6 is a front elevation of the fluid container retaining member shown in FIG. 5.

FIG. 7 is an end elevation of the fluid container retaining member shown in FIGS. 5 and 6.

FIG. 8 is a view showing the location of the nozzle in the nozzle bushing.

Figure 1:
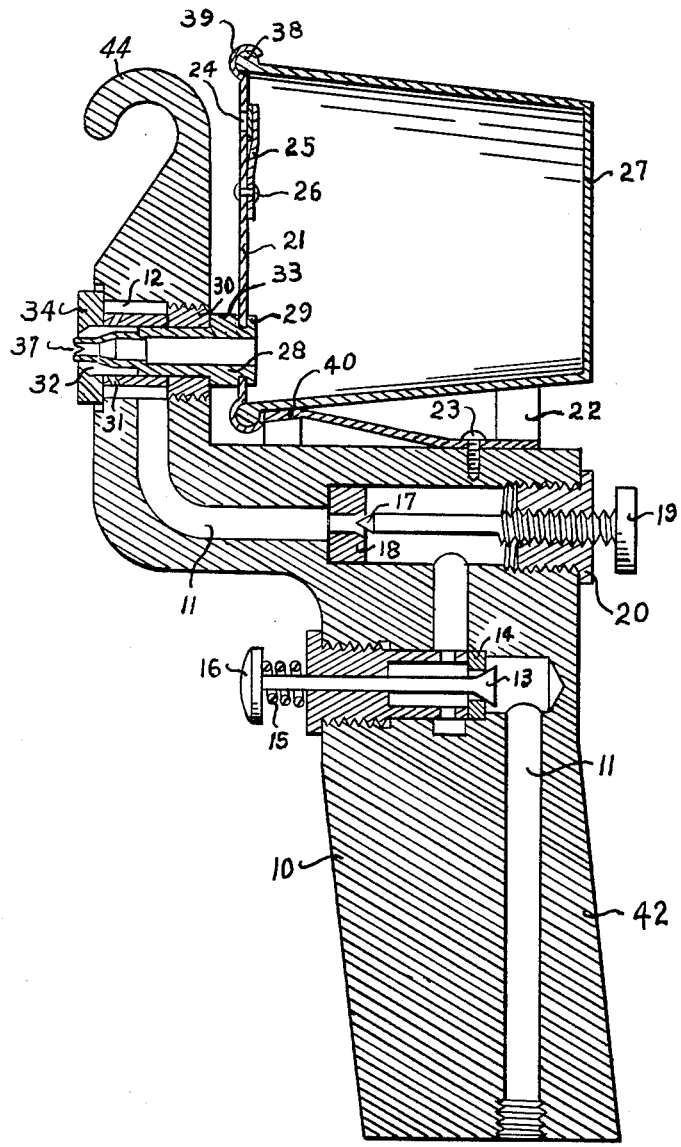
FIG. 1 is a sectional view of my viscous fluid applicator.

Referring in more detail to the drawings, the numeral 10 refers to the body member of my viscous fluid applicator. An air inlet passageway extends from the bottom of the annual air chamber 12. An air shut off valve 13 operating on the seat 14 is located in the air passageway 11. The air shut off valve is closed by means of the spring 15. The air shut off valve is opened by pressing the valve button 16. A flow control valve is provided in the air passageway 11 by means of the needle valve 17 and the needle valve seat 18. The male threaded portion of the needle valve 17 engages the female threaded portion of the valve stem bushing 20 and is adjusted by means of the knob 19.

A fluid container with a removable cover 21 is held in position by means of the container retaining spring member 22 which in turn is secured to the body member 10 by means of a screw member 23. A vent opening 24 is located in the cover member 21. A spring member 25 secured to the cover member 21 by means of the rivet 26 keeps the vent opening 24 closed except for the purpose of admitting air to the container as the fluid is used from the fluid container 27. A nozzle member 28 is secured to the cover member 21 by bending the flange portion 29 after the nozzle member is inserted in the opening in the cover member 21.

A nozzle bushing 30 is secured in the body member 10 as shown in FIGS. 1 and 2. The nozzle bushing 30 provides an annular air chamber 12 between the nozzle bushing 30 and the body member 10 as shown in FIGS. 1 and 2. Air passageways 31 connect the annular air chamber 12 with the nozzle air chamber 32. The nozzle 28 is provided with a shoulder 33 that butts against the nozzle bushing 30 as shown in FIGS. 1 and 2. The nozzle member 28 extends the entire length of the nozzle bushing 30 and protrudes through the nozzle bushing opening 36. A seating portion 35 of the nozzle member 28 near the nozzle shoulder 33 slip fits in the nozzle bushing 30. Tapered V-slots 37 are provided in the discharge end of the nozzle member 28 as shown in FIGS. 3 and 4. The nozzle bushing may be made of one piece as shown in FIG. 2 or a collar member 34 may be welded or otherwise secured to the nozzle bushing 30 as shown in FIG. 1. The body member 10 is provided with a hook member 44 so the unit can be hung up while not in use.

The viscous fluid container 27 is preferably a paper or other inexpensive discardable container. The fluid container 20 is provided with a beaded rim 38. The cover member 21 is provided with a flanged rim 39 adapted to snap over the beaded rim 38 and thereby secure the cover member 21 to the fluid container 27. The nozzle member 28 is preferably made of plastic or other inexpensive material so that the fluid container 27, the cover member 21 and the nozzle 28 can be discarded after it is used.

When it is desired to use my novel viscous fluid applicator the desired amount of viscous fluid is placed in the fluid container 27 and the flanged portion 39 of the lid member 21 is snapped over the annular bead 38. The nozzle 28, which is secured to the lid member 21, is then inserted in the opening in the nozzle bushing 30 and pushed therethrough until the shoulder 33 butts against the nozzle bushing 30. As the nozzle 28 is pushed into position the portion 40 of the spring member 22 is depressed and as soon as the nozzle 28 is in position the beaded rim portion 38 passes the spring member 22 thus allowing the portion 40 of the spring member 22 to spring up. After the portion 40 of the spring member 22 springs up it engages the beaded rim portion 38 and thereby holds the fluid container 27 and the nozzle member 28 in position. The viscous fluid applicator is then ready for use. The lower portion 42 of the body member 10 provides a grip or handle for the operator.

When the operator desires to use the viscous fluid applicator the operator opens the air shut off valve 13 by pressing the valve button 16. Compressed air from a source of supply (not shown) then flows through the air inlet passageway 11 to the annular air chamber 12 and then through the air passageways 31 to the nozzle air chamber 32. The annular air guide 41 then directs the flow of air from the nozzle air chamber 32 toward the nozzle member 28. The air then flows through the V-shaped slots 37 and also over the discharge end of the nozzle member 28 thereby picking up drops of viscous fluid from the discharge end of the nozzle and carries the drops of the viscous fluid to the surface to be coated with the viscous fluid. The operator can control the flow of air to give the proper spray of viscous fluid by turning the valve knob 19 which adjusts the position of the needle valve 17 with respect to the needle valve seat 18.

When the application of the viscous fluid has been completed the operator releases the valve button 16 thereby stopping the flow of air to the nozzle chamber 32 which in turn stops the spray of viscous fluid. The unit comprising the fluid container 27, the cover member 21 and the nozzle 28 can then be removed by depressing the portion 40 of the spring member 22 and then pulling the nozzle 28 out of the nozzle bushing 30. The container 27, the cover member 21 and the nozzle 28 may then be discarded. It will be noted that all parts of my viscous fluid applicator that contact the viscous fluid are discarded. In some cases a few drops of viscous fluid may be deposited on the flat surface of the nozzle bushing 30 surrounding the nozzle bushing opening 36. This flat surface can readily be cleaned. Hence, it will be noted that my viscous fluid applicator eliminates the need of cleaning a permanent nozzle, a fluid container and other intricate parts as must be done when cleaning the present type of viscous fluid applicators. The process of cleaning the present types of viscous fluid applicators is not only tedious and difficult but it requires considerable time and often is not done properly. When the present type of applicator is not cleaned properly it is usually rendered useless and thereby causes the loss of expensive equipment. My novel viscous fluid applicator eliminates all of these undesirable features.

The V-slots 37 and the arrangement of parts of my viscous fluid applicator cause the air to pick up the viscous fluid in droplets and substantially eliminates atomization. This substantially eliminates the mist of viscous fluid in the surrounding air, thereby, eliminating the need of air purifying equipment that is needed when the present type atomizing applicators are used. It will be noted that nozzle 28 extends slightly beyond the nozzle bushing 30. This arrangement aids in eliminating atomization and also keeps the nozzle bushing free of viscous fluid.

While I have described one embodiment of my invention it is apparent that many modifications therein can be made without departing from the scope of the invention as set forth in the appended claims.

Having thus described my invention, what I claim is:

1. A viscous fluid applicator comprising a body member, a nozzle bushing secured in said body member, a nozzle member engaging said bushing and extending therethrough, a fluid container provided with a removable cover, said nozzle member secured to said cover, a fluid passageway in said nozzle member communicating said fluid container with the discharge end of said nozzle member, a plurality of converging V-shaped slots located in the discharge end of said nozzle member extending to said fluid passageway, a resilient member secured to said body member and engaging said fluid container, said resilient member yieldably retaining said fluid container and said nozzle member in operative position and an air passageway in said body extending to an air chamber between said nozzle member and said nozzle bushing and terminating in an annular discharge outlet surrounding said nozzle.

2. A viscous fluid applicator comprising a body member, a nozzle bushing secured in said body member, a nozzle member slidably located in said nozzle bushing and extending therethrough, a fluid container secured to said body member, said fluid container provided with a removable lid, said nozzle member secured to said removable lid of said fluid container, a fluid passageway in said nozzle member extending from said fluid container to the discharge end of said nozzle member, a plurality of V-shaped slots located in said discharge end of said nozzle member communicating with said fluid passageway, a resilient member secured to said body member yieldably retaining said fluid container and said nozzle member in position, an air passageway in said body member extending to an air chamber located intermediate said nozzle bushing and said nozzle member and terminating in an annular discharge orifice surrounding said discharge end of said nozzle member and an annular flange provided by said nozzle bushing arranged to direct the flow of air from said discharge nozzle toward the discharge end of said nozzle member.

3. A viscous fluid applicator comprising a body member, a nozzle bushing secured in said body member, a fluid container, a removable cover closing said fluid container, an atmospheric vent located in said cover, a nozzle secured to said cover, said nozzle adapted to slip fit into said nozzle bushing and extend therethrough, a fluid passageway communicating the discharge end of said nozzle with said fluid container, a plurality of V-shaped slots located in said discharge end of said nozzle and communicating with said fluid passageway, a resilient member secured to said body member adapted to hold said fluid container and said nozzle in operable position, an air passageway in said body member extending to an annular air chamber intermediate said body member and said nozzle bushing and a plurality of air passageways extending from said annular air chamber to a nozzle air chamber encircling said nozzle member, said nozzle air chamber extending to a discharge outlet near the discharge end of said nozzle.

4. A viscous fluid applicator comprising a body member, a nozzle bushing secured in said body member, a fluid container provided with a removable cover, a vent opening in said cover member, a spring loaded valve closing said vent opening, a nozzle member secured to said cover, said nozzle adapted to slip fit into said nozzle bushing and extend therethrough beyond the discharge end thereof, a fluid passageway in said nozzle communicating said fluid chamber with the discharge end of said nozzle, a plurality of V-shaped slots in said discharge end of said nozzle communicating with said fluid passageway, a resilient member secured to said body member engaging said fluid container and yieldably retaining said fluid container and said nozzle in operable position, an air passageway in said body member extending to an annular air chamber intermediate said body member and said nozzle bushing, a plurality of air passageways extending from said annular air chamber to a nozzle air chamber intermediate said nozzle and said nozzle bushing, said nozzle air chamber extending to a discharge orifice surrounding said discharge end of said nozzle and an inwardly extending flange located at the discharge end of said nozzle bushing said inwardly extending flange arranged to direct the flow of air from the discharge orifice toward said discharge end of said discharge nozzle.

5. A viscous fluid applicator comprising a body member, a nozzle bushing secured in said body member, a fluid container provided with a removable cover, an atmospheric vent in said cover provided with a spring loaded valve, a nozzle secured to said cover, said nozzle adapted to engage said nozzle bushing and extend therethrough, a fluid passageway in said nozzle communicating said fluid container with the discharge end of said nozzle, a plurality of V-shaped slots in said discharge end of said nozzle extending beyond said nozzle bushing and communicating with said fluid passageway, a resilient member secured to said body member retaining said fluid container and said nozzle in operable position, an air passageway in said body member extending to an annular air chamber intermediate said body member and said nozzle bushing, an air shut off valve and an air flow control valve located in said air passageway, a plurality of air passageways extending from said annular air chamber to a nozzle air chamber intermediate said nozzle and said nozzle bushing, said nozzle air chamber extending to a discharge orifice encircling said discharge end of said nozzle, and an annular inwardly extending flange arranged to direct the flow of air from said discharge orifice toward said discharge end of said nozzle.

6. A viscous fluid applicator comprising a body member, a nozzle bushing secured in said body member, a nozzle member engaging said bushing and extending therethrough, a fluid container secured to said body member, said fluid container provided with a removable cover, said nozzle member secured to said cover, a fluid passageway in said nozzle member communicating said fluid container with the discharge end of said nozzle member, a plurality of converging V-shaped slots located in said discharge end of said nozzle member and extending to said fluid passageway and an air passageway in said body member extending to an air chamber between said nozzle member and said nozzle bushing and terminating in an annular discharge outlet surrounding said nozzle.

References Cited in the file of this patent

UNITED STATES PATENTS

| | | |
|---|---|---|
| 1,892,260 | Wick | Dec. 27, 1932 |
| 2,172,689 | Desper | Sept. 12, 1939 |
| 2,656,217 | Roche | Oct. 20, 1953 |
| 2,795,461 | Durkin | June 11, 1957 |
| 2,820,578 | Dickman | Jan. 21, 1958 |
| 2,868,585 | Esser | Jan. 13, 1959 |
| 2,895,685 | Peeps | July 21, 1959 |

FOREIGN PATENTS

| | | |
|---|---|---|
| 423,481 | Italy | July 17, 1947 |